(12) United States Patent
Zemany

(10) Patent No.: US 7,307,575 B2
(45) Date of Patent: Dec. 11, 2007

(54) THROUGH-THE-WALL FREQUENCY STEPPED IMAGING SYSTEM UTILIZING NEAR FIELD MULTIPLE ANTENNA POSITIONS, CLUTTER REJECTION AND CORRECTIONS FOR FREQUENCY DEPENDENT WALL EFFECTS

(75) Inventor: Paul D. Zemany, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 170 days.

(21) Appl. No.: 11/156,948

(22) Filed: Jun. 20, 2005

(65) Prior Publication Data
US 2006/0284757 A1 Dec. 21, 2006

Related U.S. Application Data

(63) Continuation-in-part of application No. PCT/US2004/036446, filed on Nov. 2, 2004, which is a continuation-in-part of application No. PCT/US2004/030116, filed on Sep. 14, 2004.

(51) Int. Cl.
*G01S 13/52* (2006.01)
*G01S 13/538* (2006.01)

(52) U.S. Cl. ............... 342/22; 342/160; 342/453

(58) Field of Classification Search ........ 342/159–160, 342/162
See application file for complete search history.

(56) References Cited

U.S. PATENT DOCUMENTS 5,592,170 A * 1/1997 Price et al. .................. 342/22
6,252,396 B1 * 6/2001 Arndt et al. .............. 324/207.17
6,426,718 B1 * 7/2002 Ridgway ................... 342/160
6,799,047 B1 * 9/2004 Bahl et al. ............... 455/456.1
2002/0175849 A1* 11/2002 Arndt et al. ................. 342/22
2005/0080560 A1* 4/2005 Hatch ......................... 701/213
2005/0208952 A1* 9/2005 Dietrich et al. .......... 455/456.1

OTHER PUBLICATIONS

Seidel, Scott Y. 914 MHz Path Loss Prediction Models for Indoor Wireless Communications in Multifloored Buildings. Feb. 1992, IEEE Transactions on Antennas and Propagation, vol. 40 No. 2, pp. 207-217.*

* cited by examiner

*Primary Examiner*—Thomas H. Tarcza
*Assistant Examiner*—Shelley Chen
(74) *Attorney, Agent, or Firm*—Robert K. Tendler (57) ABSTRACT

Lower resolution and clutter-prone two-tone CW radars can have the displayed images dramatically improved by three techniques involved in the subject invention. The three techniques involved are the stepping of each of the multiple radars for readings at multiple frequencies, weighting the results to compensate for wall-induced distortions and differential image processing. In one embodiment, weights for each frequency counteract the distortion produced by particular wall. For differential image processing, temporal snapshots of the images are subtracted one from the other such that the result is only due to moving objects, thus to provide a dramatic display of the presence and position of moving individuals behind a wall.

22 Claims, 8 Drawing Sheets

Fig. 1

At location 0

*Fig. 2*

At location λ/4

*Fig. 3*

At location between 0 and λ/4

Fig. 6 predicted $f_2$ waveforms for different ranges 10 meters apart

THROUGH-THE-WALL FREQUENCY STEPPED IMAGING SYSTEM UTILIZING NEAR FIELD MULTIPLE ANTENNA POSITIONS, CLUTTER REJECTION AND CORRECTIONS FOR FREQUENCY DEPENDENT WALL EFFECTS

RELATED APPLICATIONS

This application is a continuation-in-part of U.S. patent application Ser. No. PCT/US2004/036446 filed Nov. 2, 2004, entitled Dual Frequency Through-the-wall Motion Detection and Ranging Using Difference-Based Estimation Technique, which is a continuation-in-part of U.S. patent application Ser. No. PCT/US2004/030116 filed Sep. 14, 2004, the contents of which are incorporated herein by reference.

STATEMENT OF GOVERNMENT INTEREST

The invention was made with United States Government support under Contract (Grant) No. N39998-97-C-5216. The United States Government has certain rights in this invention.

FIELD OF THE INVENTION

This invention relates to through-the-wall sensors and more particularly to the improvement on accuracy for those through-the-wall sensors using two-tone CW radars by frequency stepping the radars, weighting the results, and detecting motion through differential image formation techniques.

BACKGROUND OF THE INVENTION

As described in PCT Patent Application Ser. No. US2004/036446 filed Nov. 2, 2004 entitled Dual Frequency Through-the-wall Motion Detection and Ranging Using Difference-Based Estimation Technique, invented by Paul Zemany and Eldon Sutphin, and as described in patent application Ser. No. 11/121,787 filed May 3, 2005, multiple dual frequency radars spaced about a building have been used to localize the position of a moving individual in the building so as to provide information about the whereabouts of personnel, whether it is for the purpose of rescue, such as for firefighters, EMTs and the like, or to pinpoint enemy personnel in a building.

The above patent applications, incorporated herein by reference and assigned to the assignee hereof, describe the use of a multi-tone set of radars that detect and define the range to a moving object behind a wall, with triangulation techniques used to detect and track the moving object as it moves within the building or behind a wall.

Multi-tone CW radars are used, in which the two tones are fairly close together, with it being possible by analyzing the returns from moving objects to determine the range of the object to the various radar transmitters. By using multiple transmitters one can triangulate to be able to pinpoint the individual within the structure from the outside of the structure.

While the systems described in the above-mentioned patent applications work very well to detect the presence of a moving object and to detect its range and in fact its location, various problems nonetheless exist due to a number of factors, not the least of which is the fact that the wall of an edifice of building has material that differently affects radar beams at different frequencies due to the frequency-dependent difference in attenuation. It will be appreciated that in synthetic aperture radars, the angular resolution is given by $\lambda/d$ where $\lambda$ is the wavelength and d is the length of the baseline on which the measurement is to be made. However, resolution is critically dependent on pulse shape, and with pulse shape altered by wall materials, image resolution is adversely affected. There is therefore a requirement to take into account wall density and material to improve image accuracy.

Note that with both range and angle information, 2D representation consisting of range and azimuth pixels can be formed. Note also that if the baseline has both horizontal and vertical extent, 3D representation is possible. In this case each cell represents range, azimuth and elevation. However, without correction these representations will be fuzzy due to the alteration of the pulse shape as the pulses pass through the wall.

In general, frequency bandwidth provides range resolution and the baseline geometry provides angle resolution. The quality and/or details contained in the image depends on the bandwidth, baseline range, wall distortions, wall uniformity and wall absorption. In addition, the quality of the image depends on the position accuracy and velocity measurements.

Thus, due to the variability of wall transmissivity, the range measurements are coarse at best and it is only with difficulty that one can establish an accurate range to a moving object behind a wall.

If use could be made of the fact that the interaction of objects and RF energy is linear in the amplitude domain, one could potentially improve upon range accuracy by adding the amplitude response caused by a first signal to the amplitude response caused by a second signal to get the response caused by a signal that is the sum of both signals. As will be seen, because of this linearity in amplitude, it would be possible to use a set of closely-spaced, frequency-stepped CW measurements taken at widely different frequencies and closely-spaced points to provide improved resolution.

Moreover, all of the above multi-tone through-the-wall radars require object movement to obtain range. There are, however, returns from non-moving objects that complicate analysis of the returns. Thus artifacts from non-moving objects can corrupt the display of returns from moving objects.

Thus, while it is indeed useful to be able to ascertain whether or not a person is within a building due to the detection of their movement and while it is also useful to pinpoint, to the extent possible, their position and track using multiple multi-tone CW radars, there is nonetheless a requirement to obtain more precise measurements and more accurate tracks while at the same time distinguishing other artifacts in the room such as chairs, desk, tables and lamps, etc. These artifacts are in general non-moving so that theoretically one should be able to distinguish a moving object from one that is not.

SUMMARY OF INVENTION

In the subject invention, a through-the-wall frequency-stepped imaging system uses near-field multiple antenna positions, clutter rejection and corrections for frequency-dependent wall effects to improve accuracy and readability of through-the-wall CW radars. The subject system uses frequency-stepped radars to obtain multiple readings at different frequencies, with the more frequencies sampled the higher the location accuracy. Secondly, a weighting system is provided that corrects range measurements for the characteristics of the particular wall. Thirdly, a differential image technique rejects clutter that is the result of returns from non-moving objects.

More particularly, in order to ameliorate the effects of different wall thicknesses and materials, the system steps the frequency of the radars and applies a weight for each frequency to correct for pulse distortions through the wall. The result is that the subject system minimizes the problem of the dispersive frequency-dependent effects of the wall. When using stepped frequencies one must compensate for wall-induced effects at each frequency because in typical broadband pulses, there is a considerable difference between what happens at the low end of the pulse frequency spectrum and the high end.

In the subject frequency stepping system one applies a correction for each frequency step that inverse-weights the effect of the wall and resharpens the pulse. The result is a much better defined range, since the result for each of the stepped frequencies in maximized, with the process being performed at each antenna position. Thus the system is able to obtain better range measurements from which the system triangulates and renders an indication of the position of a moving individual.

In one embodiment the optimal weights as a function of frequency are determined knowing wall thickness and the index of refraction of the wall. These can either be input from measurements or be estimated.

Alternatively, an auto-focus system is provided in which trial wall thicknesses and indices are input to an auto-focus program. When focus has been achieved, that wall thickness and index leading to the focus condition yield the wall thickness and index that actually exist. This wall thickness and index can then be used in the above algorithm to generate the aforementioned weights.

Having applied predetermined weights for each frequency, the use of multiple frequencies for each pair presents the ability to provide an even more accurate range measurement. Note with two frequencies of the two-tone radars one can obtain a range solution. With multiple two-tone frequencies one can get multiple solutions for each two-tone pair that can be averaged to obtain more accurate results.

Moreover, multiple stepped frequencies can be used to reduce range ambiguities. For instance, one pair of frequencies can be selected to be widely separated to provide fine spatial resolution. However, with wide separation comes range ambiguity. However, at the same time, other separations can be made close together to resolve the range ambiguity.

For instance, if for a given radar one chooses one of the two tones (F1) to be 900 MHz and the other of the two tones (F2) to be 910 MHz, this provides a 15-meter range cell, which is 30 meters divided by 4.

On the other hand, for this radar, choosing an additional frequency F3 to be 920 MHz, this provides a 7.5-meter range cell, thus improving the resolution.

One then uses the F1-F3 spread to obtain the high resolution, albeit with range ambiguity. One then uses the F1-F2 spread to resolve the ambiguity.

Thus, by using multiple stepped frequencies for the two-tone radars, one can obtain better resolution by averaging; or one can get higher-resolution range results using wide frequency spreads, with range ambiguities resolved by narrower frequency spreads.

The net total result is improved resolution either by the weighting system or by the use of multiple frequencies and different frequency spreads.

Having improved the resolution of a two-tone CW radar substantially by readings at multiple frequencies and taking into account wall effects, the system goes further to subtract out clutter that is the result of returns from non-moving objects. This is accomplished by producing two images at two different times and subtracting one from the other. What remains after the subtraction is only that which is due to a moving object. This permits distinguishing non-moving objects such as furniture, lighting and non-moveable objects from moving objects such as an individual moving behind the wall.

The result is that one takes an image that has been generated using corrections for frequency-dependent wall effects and provides a display in which the only returns that are displayed are the differences between two snapshots or images formed at two different times. This allows the system to process out clutter because the images that are generated result only from moving objects. It will be appreciated that the images at two different instants of time initially include all returns from objects, whether they are moving or not. Since one is only interested in moving objects such as people moving in a room or behind a wall, displaying only the difference between the two temporal images represents only objects that are in motion. The result is that one can readily distinguish moving objects from stationary objects.

As to range accuracy improvement, processing at multiple frequencies using the above-mentioned weights increases the accuracy obtainable from non-compensated systems by as much as 50%.

This coupled with the ability to distinguish returns from non-moving objects when rendering position provides for an exceptionally robust through-the-wall radar capable of localizing and tracking individuals in a very precise manner as they move behind a wall.

In summary, the lower resolution and clutter-prone two-tone CW radars described above can have the displayed images dramatically improved by the three techniques involved in the subject invention. The three techniques involved are the stepping of each of the multiple radars for readings at multiple frequencies, weighting the results to compensate for wall-induced distortions and differential image processing. In one embodiment, weights for each frequency counteract the distortion produced by particular wall. For differential image processing, temporal snapshots of the images are subtracted one from the other such that the result is only due to moving objects, thus to provide a dramatic display of the presence and position of moving individuals behind a wall.

BRIEF DESCRIPTION OF THE DRAWINGS

These and other features of the subject invention will be better understood in connection with a Detailed Description, in conjunction with the Drawings, of which.

DETAILED DESCRIPTION

Multi-tone CW Radar

To describe the operation of the multi-tone CW radar used in the subject invention, it was found that for an object exhibiting constant motion or velocity the phase shift between the two waveforms representing the phase difference between transmitted and returned waves for the two tones or frequencies is directly related to range. This is because comparing waveforms corresponding to the phase difference between the outgoing and incoming waves at the two frequencies results in a relationship between the phase shift between the two waveforms and range. For instance, at zero range there is no difference in phase between the two waveforms. At a range equal to $\lambda/4$ one has a 180° phase shift between the two waveforms. In between, for constant motion objects there is a linear relationship between phase shift and range such that by measuring phase shift between the two waveforms one can deduce range. Here $\lambda$ is the wavelength associated with the difference in $f_1$ and $f_2$, or in this case one megahertz.

However, in reality individuals rarely maintain a constant velocity and it can be shown that the subject system can measure range to objects having a pseudo-random motion.

In order to determine range for random motion, the two-tone CW radar used for constant motion is used to drive a single antenna. Here continuous waves at the two frequencies $f_1$ and $f_2$ are simultaneously applied to the antenna. The system measures the phase difference between the returned versus transmitted energy for the first tone, $f_1$ and the second tone, $f_2$. This results in two waveforms each specifying the temporal phase difference for the two respective tones. In the constant motion case, the phase shift between these two waveforms indicates the range from the antenna to the moving object.

In order to accommodate the usual situation in which the object's motion varies over time, a model-based signal processing algorithm extracts range by comparing the waveform corresponding to the time sequence of phase differences for the detected returns at one of the frequencies with the predicted waveforms corresponding to the predicted phase differences for the other frequency at a number of ranges, with the waveform closest to that which is detected being declared as the range to the moving object.

Due to the use of a model-based system, movement is not limited to constant velocity or to large movements compared to the carrier wavelength, meaning that even slight hand movement can be sensed.

The model is populated by selecting the first and second tones and setting their frequencies apart by for instance one MHz. For one frequency, $f_1$, one samples the mixer output used to provide a signal corresponding to the phase difference between outgoing and incoming energy. The output of the mixer thus produces a time sequence waveform corresponding to the phase difference between outgoing and incoming waves at $f_1$. This $\emptyset_{diff}$ $f_1$ waveform is used by a predictor involving a mathematical model that predicts the time sequence waveform for $f_2$ based on information from $f_1$ for an a specific range value. The other input to the predictor is range. The model is built up in terms of generating stored waveform templates by sequencing through a number of ranges to produce a set of range-dependant templates, each keyed to a given range. The time sequence waveform for $f_2$ corresponding to the phase difference between outgoing and incoming waves from real-time data is then compared to the predicted time sequence waveform for $f_2$ to ascertain which template and thus which range offers the best fit. Optimal search methods can be employed to obtain the range value (R) that gives the best fit.

Thus, it is possible to determine range to the motion even if the motion is not constant or the target moves only a fraction of the carrier wavelength.

For random motion, the system provides not only an indication of the existence of an individual but also determines the range to the individual by first developing range templates or using an iterative search to find the best range value, and by comparing the data associated with real-time returns to the templates, with a matching algorithm determining range.

The range templates in one embodiment are generated by a predictor that predicts from one waveform corresponding to the phase differences for the first tone, namely $f_1$, the predicted phase differences for the second tone.

The predictor algorithm is based on using the time domain signal or temporal waveform corresponding to the temporal phase difference between outgoing and reflected energy at $f_1$ available from a mixer for $f_1$ to predict the temporal phase difference waveform between outgoing and reflected energy at $f_2$ available as a signal produced by a mixer for $f_2$. To describe this the following are defined:

$$k_1 = 2\pi/\lambda_1 \qquad \text{Equation 1}$$

$$k_2 = 2\pi/\lambda_2 = k_1 + \Delta k \qquad \text{Equation 2}$$

The output of the mixer caused by the energy reflected from the moving target is:

$$Y_1(t) = A_1 e^{-ik_1 r(t)/2} \text{ for mixer 1} \qquad \text{Equation 3}$$

$$Y_2(t) = A_2 e^{-ik_2 r(t)/2} \text{ for mixer 2} \qquad \text{Equation 4}$$

$$Y_2(t) = Y_1(t) e^{-i\Delta k r(t)/2} \text{ obtained by substitution} \qquad \text{Equation 5}$$

The above equation predicts waveform $Y_2(t)$ using the difference between $k_1$ and $k_2$ and the range $r(t)$.

Here it can be seen that one can predict the expected temporal phase difference waveform for $f_2$ from the measured phase difference waveform for $f_1$.

By having a predicted waveform for the temporal phase differences of $f_2$, one can compare this waveform with a waveform generated from the measured actual phase differences at $f_2$.

Since the predictor generates predicted waveforms at various ranges, when the waveform generated from measured data is compared with one of the predicted waveforms, a match indicates the range to the moving object.

If the comparison results in a significant disparity between the two waveforms, one can adjust the range input to the predictor to generate another predicted waveform for $f_2$. When this newly generated waveform is compared to the waveform associated with measured data, assuming a closer match, the range associated with the newly generated predicted waveform is determined to be the actual range of the moving object.

It will be appreciated that the phase shift between the waveforms replicates at intervals of $\lambda/4$ where in this case $\lambda$ is the wavelength of the difference frequency. In general, a difference between $f_1$ and $f_2$ of one MHz corresponds to a $\lambda$ of about 300 meters. $\lambda/4$ thus corresponds to 75 meters and is termed a "range cell." Returns from moving objects outside of the range cell that would duplicate those inside the range cell can be distinguished in terms of the amplitude of the signals returned from the moving object. Thus a much-decreased amplitude return indicates a moving object in a second or third range cell.

The size of the range cell and thus the resolution of the system is determined by the separation in the two tones. One would normally want to start with a large range cell, in the above example 75 meters, and set the initial range cell by separating the two tones by one MHz.

If movement is ascertained within this relatively large range cell, one may subsequently decide to reduce the size of the range cell to increase resolution. If one sees activity in the larger range cell one can, for instance, increase the separation in the two tones to 3 MHz, which makes the range cells one-third the original size.

Having ascertained the range cell that all activity is in, one can increase the resolution of the subject system by increasing the separation between the two tones to decrease the range cell size and thus increase the resolution.

More particularly, this system detects not only motion in a room but also the range of the moving object. One wants to know and locate where in the building the moving object is. If one is able to measure range, this aids in that process of locating individuals in a room or behind a wall.

In order to provide range, the two-tone radar uses two frequencies that are fairly close together, for instance one megahertz apart. One chooses two close frequencies and then looks at the output of each mixer for both frequency 1 and frequency 2. By using a model that describes the differences in the frequency 1 and frequency 2 outputs, one adjusts the range parameter for the model so that when the difference between the model predictions are minimized based on observed data collected, the range that gives the best or closest agreement corresponds to the range of the moving object.

Thus, at a given distance there is a two-way trip that the signal has to travel, with a phase shift between the transmitted and received signals corresponding to that distance. If the distance changes, the phase shift will change. Since each frequency is slightly different, that phase shift will change a little bit differently for the two frequencies. What the system does is to model the two-way trip for each frequency. One frequency shows how the individual is moving in a non-uniform way and one makes a comparison with the motion of the same individual as detected by the second frequency, assuming that both frequencies monitor the same motion. The only parameter left is the range, and by adjusting range, when the range parameters come to the right value, the models for $f_1$ and $f_2$ will match and that range is a good prediction of the range of the moving object.

Figure 1:
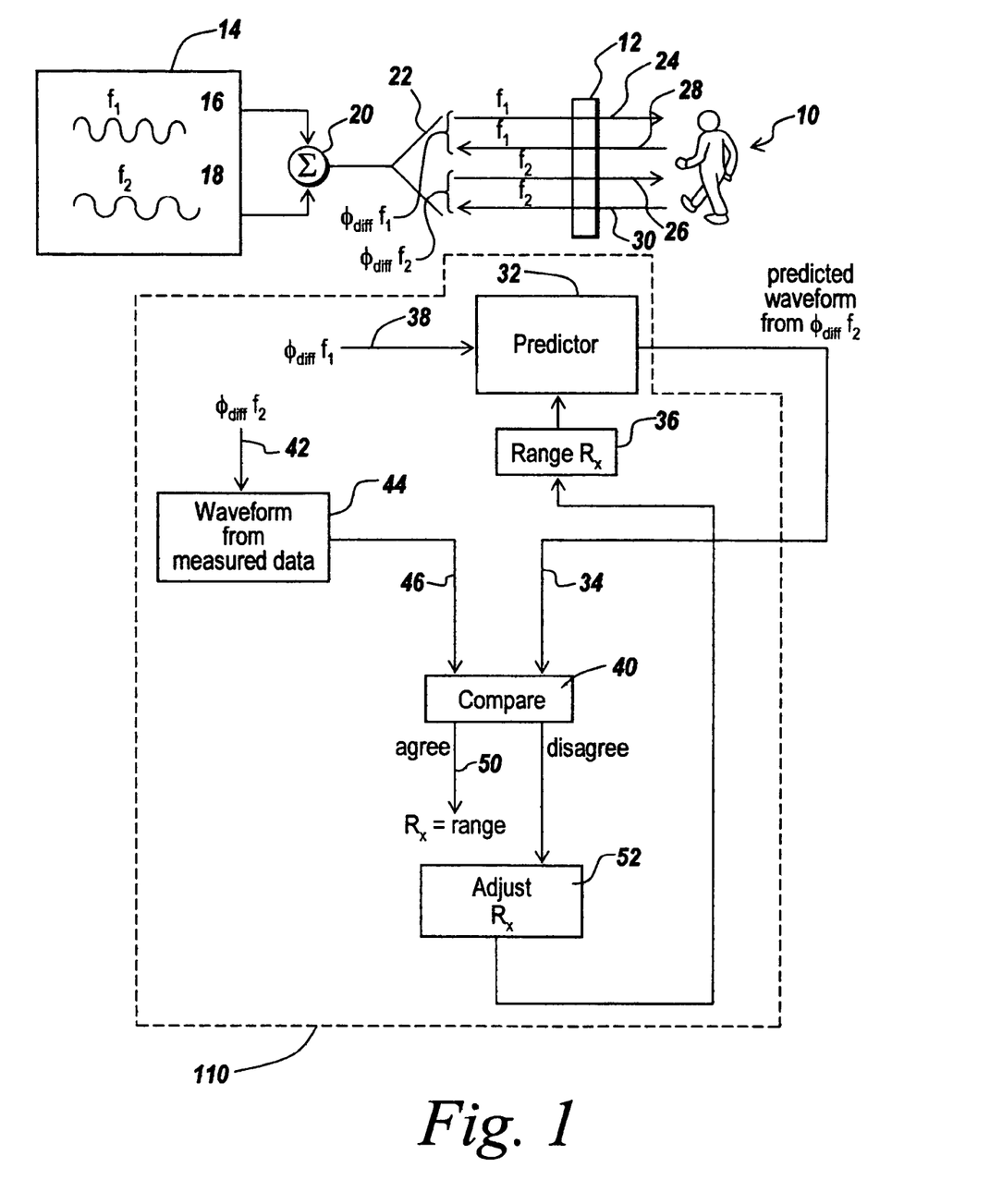
FIG. 1 is a diagrammatic illustration of the range detection system used in the subject invention in which the range to a moving object behind a wall is detected by projecting two-toned continuous waves through the wall and detecting the phase difference between outgoing and incoming waves for each of the two tones, with the phase difference signal for one frequency being applied to a predictor to generate a predicted waveform for the phase difference of the second of the two tones, with the predicted waveform being compared with a waveform derived from measured data such that when the two waveforms compare favorably, the range associated with the matched waveform is the declared range.

Referring now to FIG. 1, in order to detect the presence of an individual 10 constituting a moving object behind a wall 12, a radar 14 is provided, which transmits continuous waves 16 and 18 through a summation device 20 to an antenna 22. Antenna 22 simultaneously projects the two waveforms at $f_1$ and $f_2$ as illustrated at 24 and 26 through wall 12, where they meet object 10 and are reflected backwardly as illustrated at 28 and 30. The phase difference between outgoing and incoming waveforms for each of the frequencies is detected as will be discussed, and in one embodiment the waveform corresponding to the temporal phase difference for tone $f_1$ is coupled to a predictor 32. It is the purpose of predictor 32 to predict the temporal waveform that would be expected to exist for the temporal phase difference waveform at frequency $f_2$ for an object at a known distance or range, with the output of the predictor being a waveform on line 34. In order for predictor 32 to operate, the predictor predicts the $f_2$ waveform for a predetermined range $R_x$ as illustrated at 36, such that for a given input waveform at one frequency, a set of templates at the other frequencies corresponding to predicted waveforms at different ranges constitutes the output of predictor 32.

Predictor 32, upon receiving a waveform input on input line 38, for an initial range generates a predicted waveform for the temporal phase difference for the second tone and applies this waveform to a comparator 40.

As illustrated by arrow 42, measured data in terms of the temporal phase difference waveform for tone $f_2$ is applied to a waveform generator 44. This provides a temporal rendition of the phase difference of the outgoing and incoming waves at frequency $f_2$ from measured data. This waveform is applied on line 46 to comparator 40.

If the waveform on line 34 and the waveform on line 46 are sufficiently similar or agree, then one declares that the range to object 10 is the range that has been loaded into predictor 32 to generate the predicted waveform. This range is outputted at 50 as illustrated.

On the other hand, if there is no significant agreement between the waveforms on lines 34 and 46, then as illustrated at unit 52, the range associated with the predictor 32 is changed and the process is iteratively carried out until there is a sufficient match between the waveforms on lines 34 and 46. When there is such a match, the range that was used in the predictor 32 is the declared range to the moving target.

Figure 2:
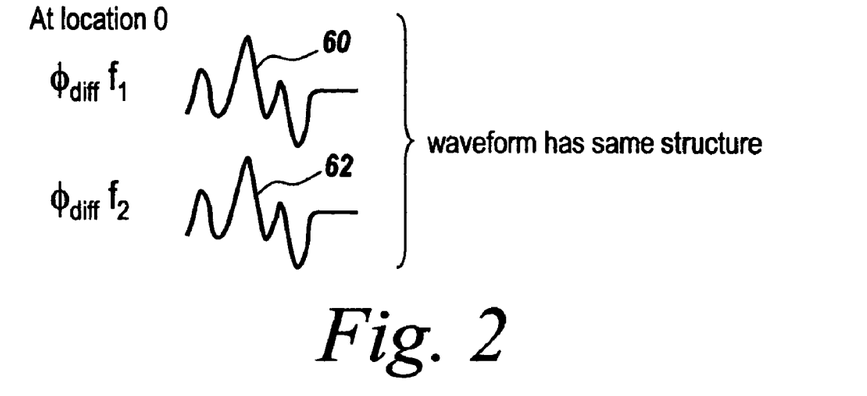
FIG. 2 is a waveform diagram for a pseudo-random moving object behind a wall, showing the phase difference waveforms for the two tones, namely $f_1$ and $f_2$, at a location that is adjacent the antenna of FIG. 1, showing the relative identity of the two waveforms.

Referring to FIG. 2, assuming that one has phase difference waveforms 60 and 62 that are the result of the radiation from antenna 22 impinging up a randomly moving object behind wall 12, then as can be seen, for a location that is adjacent antenna 22, namely at zero distance, the waveforms themselves are very nearly the same.

Figure 3:
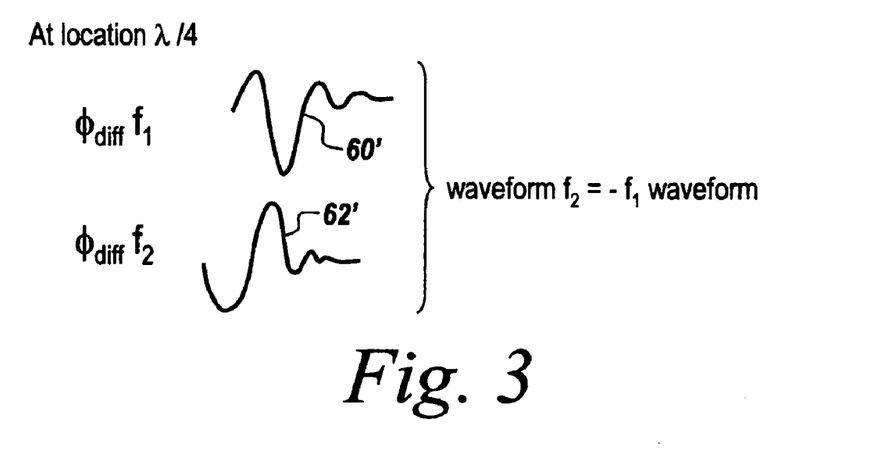
FIG. 3 is a waveform diagram for a pseudo-random moving object behind a wall, showing the phase difference waveforms for the two tones, namely $f_1$ and $f_2$, at a location at a distance from the antenna at which the waveforms are 180° out of phase.

Referring to FIG. 3, if the moving object creating the phase difference in the returns to antenna 22 is at a location that is $\lambda/4$, with $\lambda$ being the wavelength of the tone separation, in one embodiment one MHz, then waveforms 60 and 62 are those as shown as waveforms 60' and 62', which are 180° phase shifted. This means that even for pseudo-random motion that results in non-sinusoidal waveforms 60 and 62, one can nonetheless establish that the distance of the object that is moving in a pseudo-random fashion is at $\lambda/4$ away from antenna 22.

Figure 4:
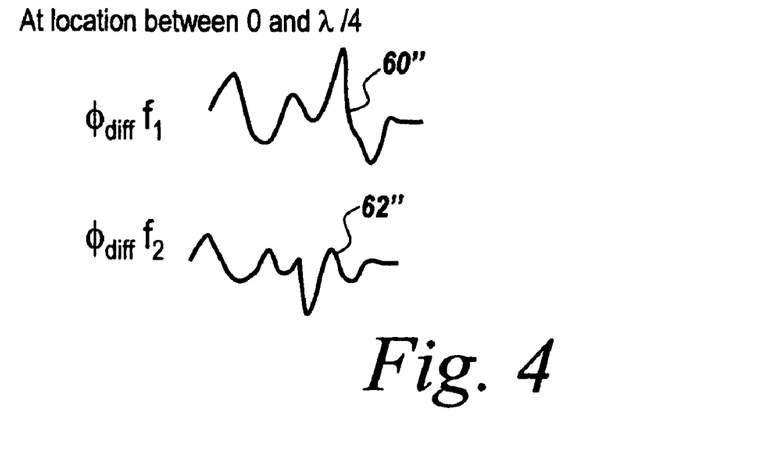
FIG. 4 is a waveform diagram for a pseudo-random moving object behind a wall, showing the waveforms for the two tones, namely $f_1$ and $f_2$, at a location intermediate the zero object position of FIG. 2 and the phase reversal object position of FIG. 3, indicating an offset between the two waveforms associated with a location between phase reversal location and the zero position of the pseudo-random moving object.

Referring to FIG. 4, for waveforms 60" and 62", these waveforms are those that result from a pseudo-random moving object at a range between zero and $\lambda/4$. If it were possible to measure the phase difference between these two non-sinusoidal waveforms, one could ascertain the distance from the antenna and therefore the range.

However, and referring back to FIG. 1, since it is not possible to accurately measure the phase shift of phase difference between waveforms 60" and 62", at least from inspection, one generates a series of waveform templates relating to one of the tones or frequencies that would be expected at one of a plurality of ranges. This waveform is predicted from the measured waveform of the other of the frequencies or tones, with the prediction algorithm being described above.

In this manner, one generates a series of waveform templates at one particular frequency or tone, which is what would be expected at various ranges. This is done by using the waveform associated with the other tone.

Having generated a series of such range-dependent templates, one then seeks to compare a waveform from measured data with the predicted waveform, which his range dependent. One can use any one of a number of curve-matching or best-fit techniques to ascertain to which of the waveform templates the measured data corresponds. When there is a sufficient match, one then declares the range to the moving object to be the range associated with the particular template to which the measured waveform was attached.

Figure 5:
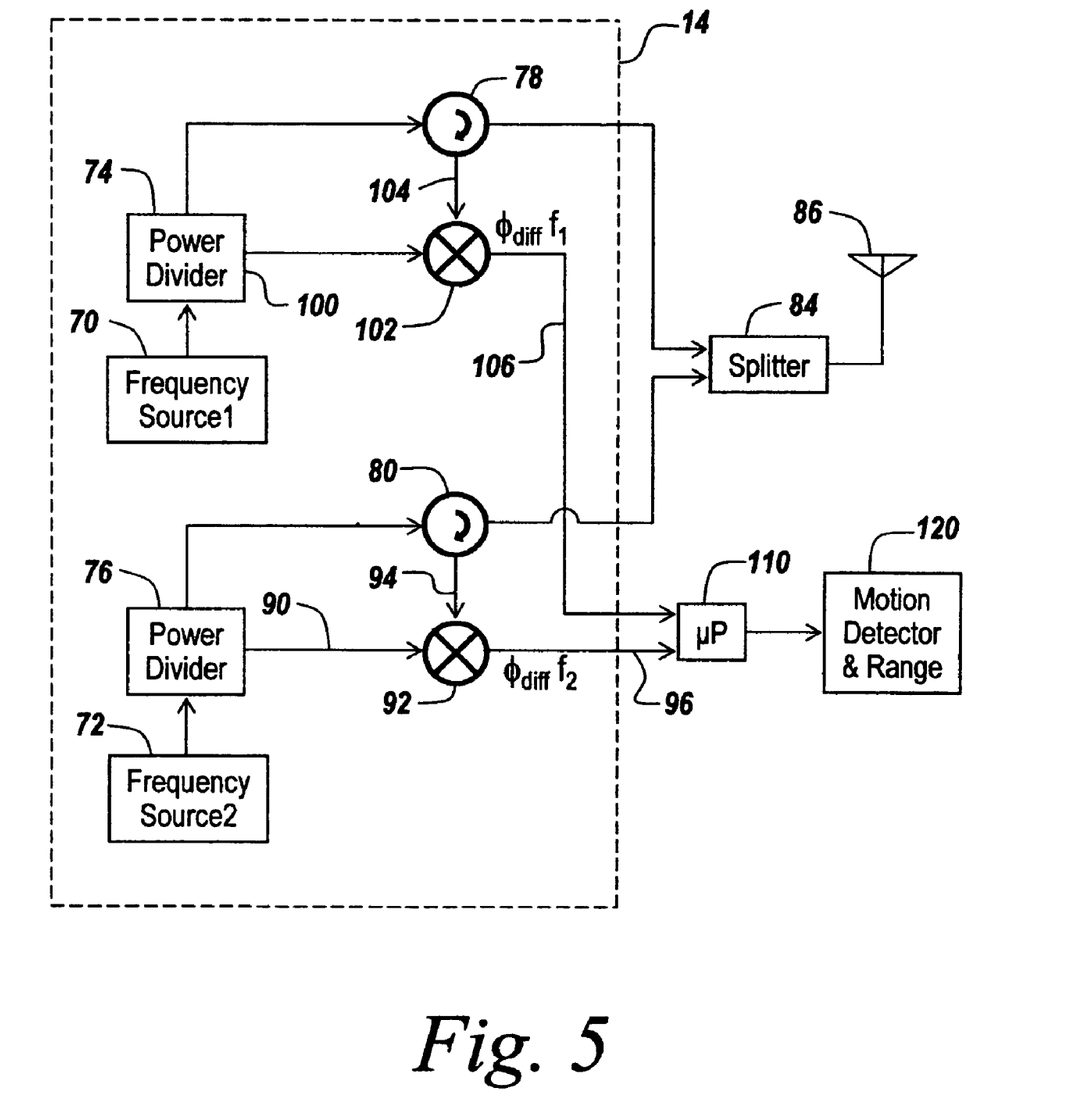
FIG. 5 is a block diagram of a two-tone CW radar for use in the subject invention in which phase difference of the outgoing and incoming signals for each of the two frequencies is detected as the output of respective mixers, with the outputs of the respective mixers being applied to a microprocessor for determining not only the presence of motion but also range to the moving object.

Referring to FIG. 5, apparatus for deriving the temporal phase difference waveforms is shown in terms of a dual frequency radar, although some advantage may be obtained by using more than two different frequencies. However, for the present purposes, radar 14 can be characterized as including a pair of frequency sources 70 and 72 respectively at $f_1$ and $f_2$, each of which driving a power divider respectively 74 and 76, the outputs of which are respectively coupled to circulators 78 and 80, the outputs of which are in turn coupled to a summing or mixing device such as a splitter 84 and thence to an antenna 86.

Power divider 76 provides an output along line 90 to a mixer 92, which mixes it with an output corresponding to the returned signal from a moving object that comes out on line 94. The output of mixer 92 along line 96 is therefore the phase difference between the outgoing and incoming signals at frequency $f_2$.

Likewise, for power divider 74, one output is applied over line 100 to a mixer 102, which has as its other input a signal on line 104 such that the output along line 106 from mixer 102 is a phase difference waveform associated with the phase difference between outgoing and incoming signals associated with $f_1$.

Microprocessor 110 performs the functions of detecting not only motion but the range to the object in motion as described above, with a motion detector and range-determining unit 120 outputting the range to the moving target, be it in continuous motion or pseudo-random motion.

It will be appreciated that microprocessor 110 contains the predictor, comparator and range adjustment functions that are described in connection with FIG. 1.

Figure 6:
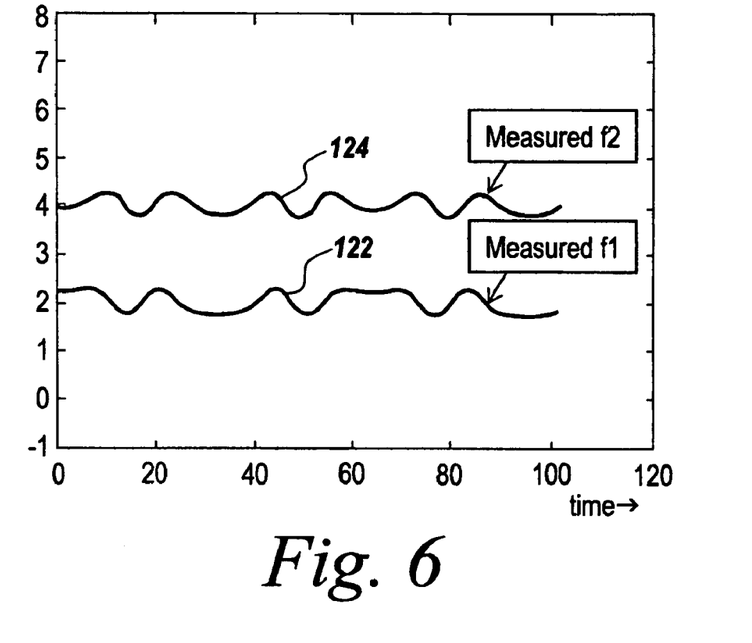
FIG. 6 is a waveform diagram of measured temporal phase differences for the two tones, $f_1$ and $f_2$, showing a difference in the two waveforms.

As illustrated in FIG. 6, the measured phase difference waveforms applied to unit 110 are illustrated at 122 for the first tone or $f_1$ and 124 for the second tone or $f_2$. Here it will be appreciated that for these signals, an object behind wall 12 has reflected the signals such that the phase difference waveforms can be generated. The range at which the object reflects the radar energy is not known and, as can be seen, the phase difference waveforms are slightly different one tone to the other.

Figure 7:
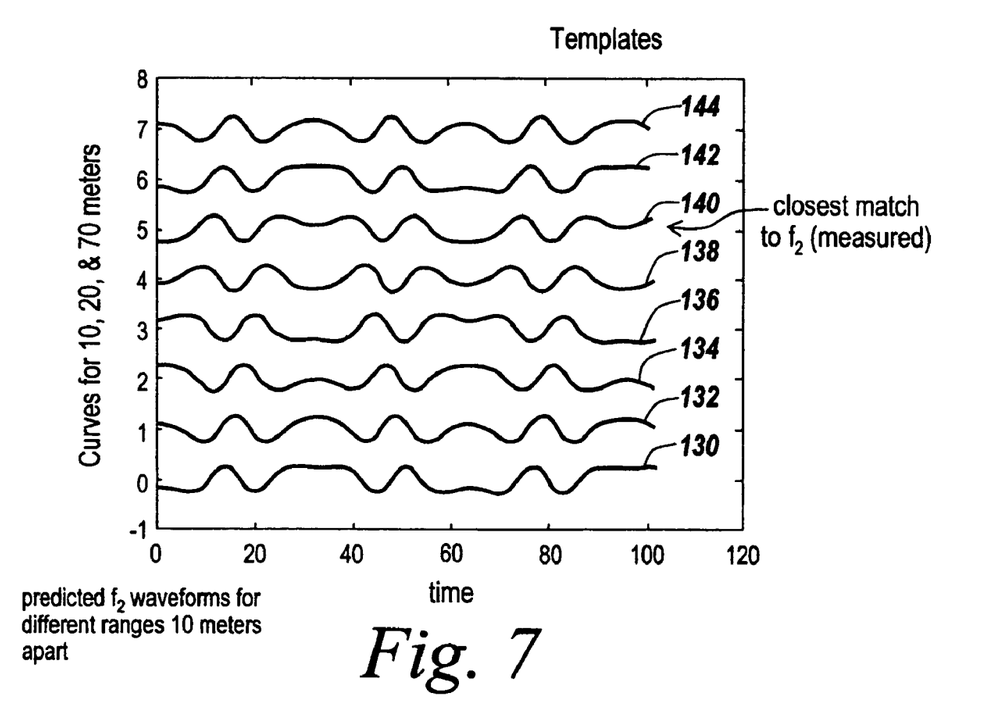
FIG. 7 is a series of projected waveforms for the second of the two frequencies at eight different ranges, with the fifth of the predicted waveforms being the closest match to the measured $f_2$ waveform corresponding to a range of approximately 50 meters.

Referring to FIG. 7, a number of waveforms 130, 132, 134, 136, 138, 140, 142 and 144 constitute a number of templates, with these waveforms being the predicted $f_2$ waveforms for different ranges. In this case the ranges are separated by 10 meters.

If, as is done by unit 110, one compares the measured waveform at $f_2$, namely waveform 122, with each of these templates, one ascertains that the closest match to the measured $f_2$ waveform is waveform 140. This leads to the declaration that the range to the object is 50 meters.

What will be seen, even though the object in question may be exhibiting a pseudo-random motion, and even though this pseudo-random motion produces phase difference waveforms that are non-sinusoidal, one can nevertheless, with waveform matching techniques, determine which of the templates is closest to the measured waveform, whereby range to the object producing this waveform can be readily ascertained with high certainty.

It will be appreciated that if one has multiple two-tone radar units at different positions and if one establishes the range to each of these radars by the techniques described herein, one can establish the position of the moving object by triangulation or other techniques.

As mentioned hereinabove, in order to get an unambiguous range determination, one has to ascertain in which range cell the moving object is. This is simply accomplished by adjusting the frequency separation between the tones to establish a large enough range cell so that one with confidence can ascertain that the moving object is within the range cell. Also, as mentioned before, amplitude-sensitive techniques can determine which range cell the object is in, since the amplitude of returns from objects farther away will be considerably reduced.

Position Determination

What has been described hereinabove is a system for robustly detecting the presence and range of a moving object within a building or behind the walls of a structure in which a multi-tone CW beam is projected through the wall and in which the range of a moving object or individual from this particular radar is determined. How to obtain instantaneous position is now described.

Figure 8:
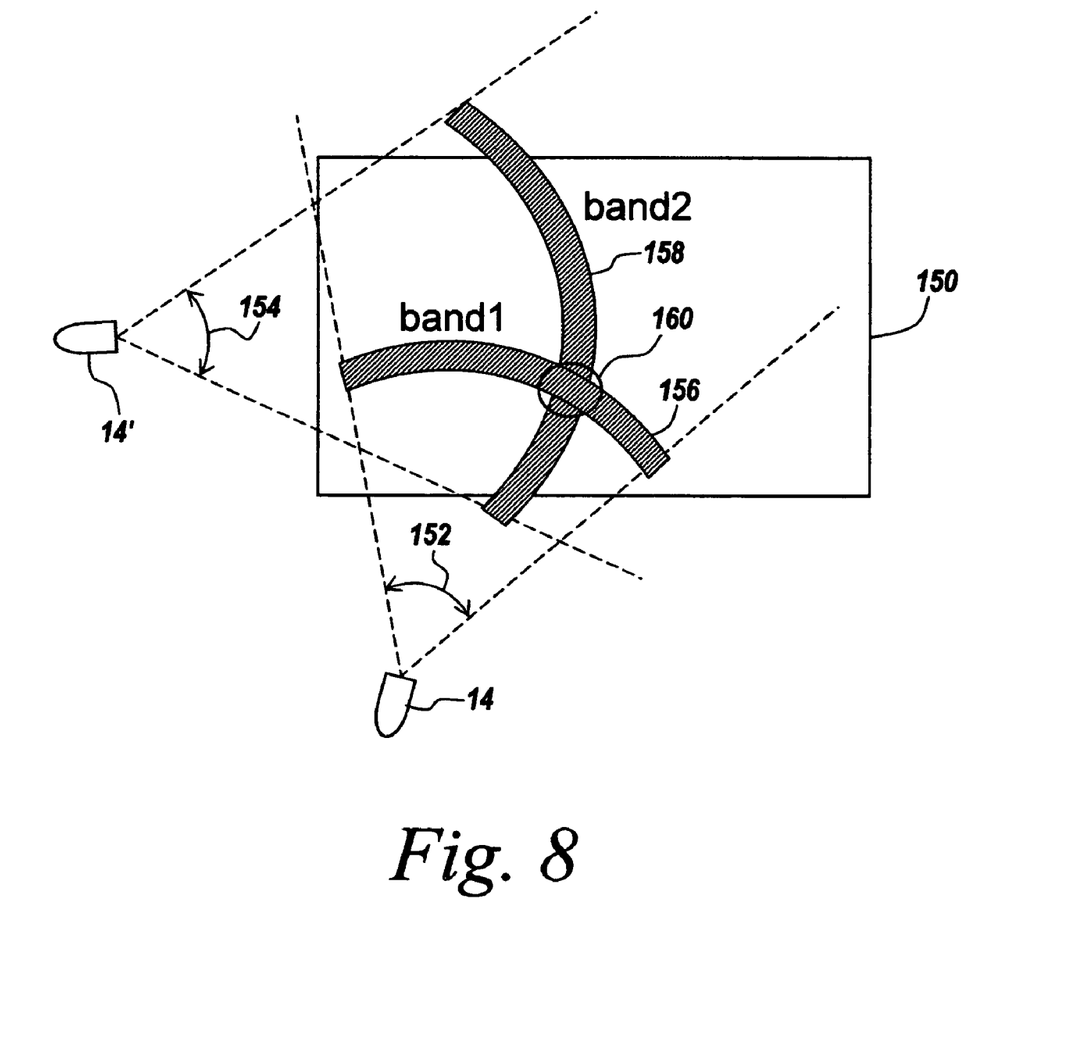
FIG. 8 is a diagrammatic illustration of the intersection of two range bands in a surveilled area from two spaced-apart multi-tone CW radars indicating the beam spread for each of the radars and indicating an intersection area of the range bands or swaths that determine the location of the moving individual within the surveilled area, with two or more range/motion-detecting radars used to obtain position.

Assuming that one duplicates the radar of FIG. 5 at two locations, here shown at 14 and 14', then one projects RF energy into a surveilled area or region of interest 150 from two different directions, subtended by beam 152 from radar 14 and beam 154 from radar 14' respectively.

The result of using the two-tone system of FIG. 5 is that a band or swath 156 of possible ranges for a moving individual from radar 14 can be generated which locates the moving individual at any given instant of time in the area subtended by Band 1, namely swath 156.

Likewise, swath 158 defines the possible positions of an individual or moving object relative to the second radar, radar 14', such that the swath of ranges is indicated by swath 158 as Band 2.

From this point it is possible to detect the overlap of Band 1 and Band 2 at position 160 to be able to compute the instantaneous position of the moving individual.

The use of multiple multi-tone CW radar range finding systems, each projecting a beam at different angles through the area to be surveilled, provides not only for the range of a moving individual or object from each of the radars but also the overlap provides for the position as well.

The area of overlap 160 is determined by the width of the various swaths, which is in turn determined by the difference in frequencies of the multi-tone radars, it being noted that the range bands can be determined ahead of time as described hereinbefore. The range bands are to occur in the nearest zone to each of the radars such that by projecting RF energy through walls of a building or other structure from two spaced-apart radars, one can triangulate on the position of the moving object or individual.

Figure 9:
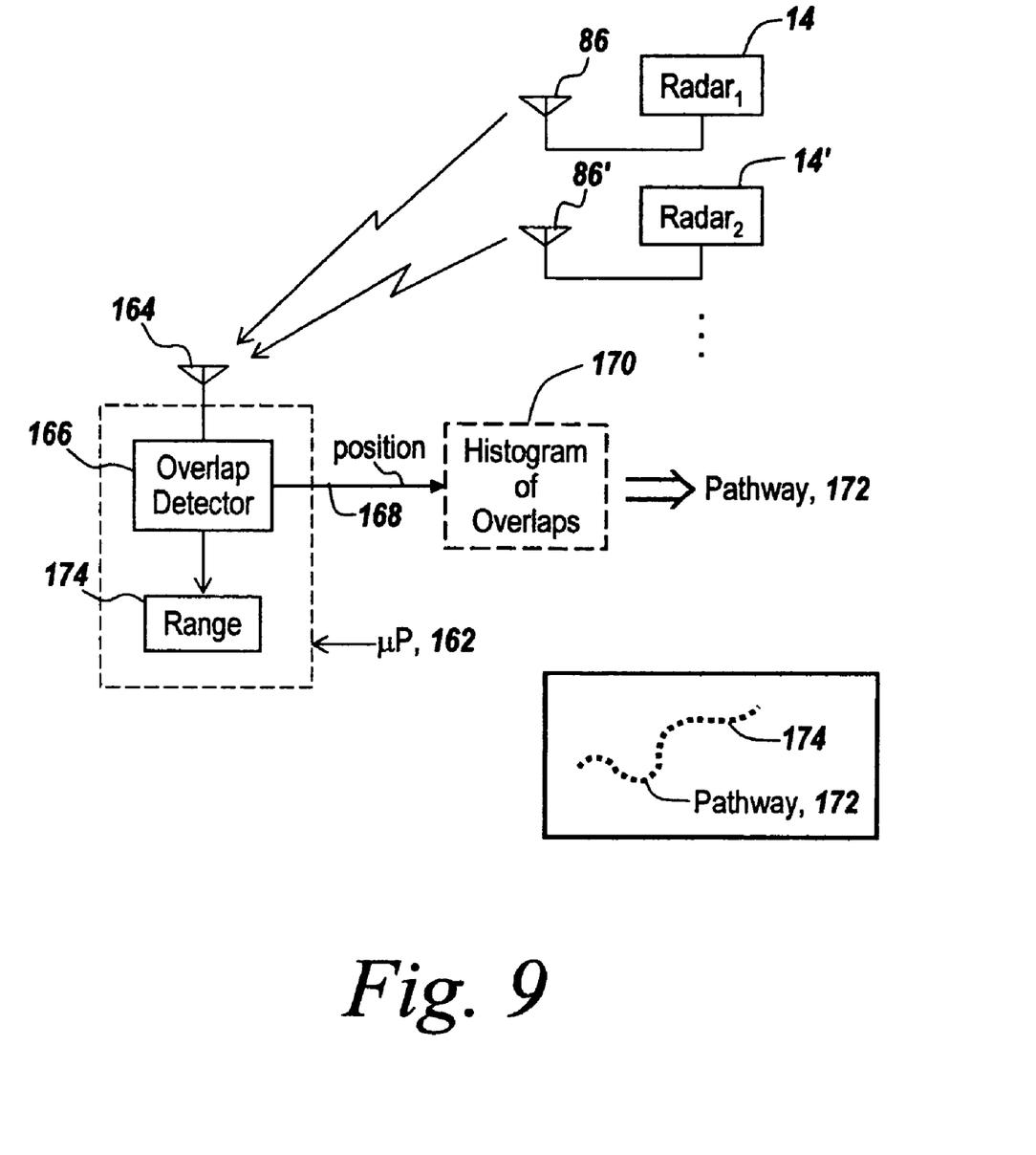
FIG. 9 is a schematic diagram of a system using the multi-tone radars of FIG. 8 in which the radars of FIG. 5 are used not only to emit radar signals but also have signals that are detected back at a microprocessor where an overlap detection is made to determine position, the range being a biproduct, and with a histogram of overlaps or positions being used to generate a pathway display.

In order to do so and referring now to FIG. 9, it can be seen that radars 14 and 14', while projecting radar signals through a particular wall, also may be used to communicate the results of the radar interrogation by modulating the selfsame signals, which results are picked up at a microprocessor 162 that carries a microwave receiver (not shown).

The signals from antennas 86 and 86' are picked up for this purpose by antenna 164, with the output of the receiver being coupled to an overlap detector 166 that taking the range derived from the two radars and the position of their antennas available over line 167 calculates the overlap area and its position relative to the positions of the two radars used in the through-the-wall sensing system.

The result of the overlap detection at its position is available over line 168, coupled in one embodiment to a histogram 170 that calculates and generates a histogram of overlaps, thus to be able to determine the pathway 172 of the moving object or individual within the surveilled area 150 of FIG. 8.

This pathway, namely pathway 172, is shown by a breadcrumb trail 174 as illustrated to indicate the path of the individual through the area behind a wall through which the RF energy is projected.

It will be appreciated that overlap detector 166 can also provide a range indication 174, which can be used either to indicate the detection of the presence of an individual or for other purposes.

Two or more units can provide ranges to the target. The known locations of the units are used along with the range values to produce a target location. With three units, it is possible to produce a 3D location. It is not required that the beam width of the radar be narrow to get an accurate position. Only the locations of each radar unit need be known. An accurate position can be produced as long as the target is within the beam pattern of each radar.

The algorithm for determining the triangulated position is now presented.

Each dual frequency radar produces a range estimate. The range estimate has an uncertainty that is as a range dependent likelihood function $P(r)$. $P(r)$ defines an arc whose center is located at the position $(x_i, y_i, z_i)$ of the ith radar unit. With two or more radar units a joint likelihood function $L(x,y,z,P(r_i),x_i,y_i,z_i))$ is formed. The target position is obtained by doing a search over $x,y,z$ to find the peak value of $L$. The algorithm to do the search can be based on a number of known methods including gradient search methods.

In operational trials, with a moving object behind a wall and spaced between 10 and 30 meters from the radars, it has been found that the positional accuracy can be as little as one meter in terms of the overlap area of the various range swaths. This is sufficient accuracy to be able to locate a trapped firefighter, a hiding enemy soldier or combatant, or in fact to provide a real-time track of a moving individual behind the wall or building structure.

Other factors for determining positional accuracy are now presented.

Tests were conducted using two radars. Best results were obtained when the target was located such that the centerlines of each beam were perpendicular to each other. In this case a 2D location can be produced to an accuracy of DR in each direction. DR is the accuracy that a single radar can measure range and is roughly 1 meter at ranges of up to 20 meters for the test unit. As the angle is reduced to less than 90°, the accuracy degrades as 1/Cos(theta) in the cross range direction.

Stepped Frequency and Differential Image Compensation

The above description supports the notion that one can pinpoint the location of a moving individual behind a wall or in a building and to track the movement of the individual using multiple multi-tone CW radars. The following describes how this system can be enhanced to improve range accuracy and therefore positional accuracy, while at the same time providing a display of position that discriminates against non-moving objects such as furniture, light fixtures, cabinets and the like.

Figure 10:
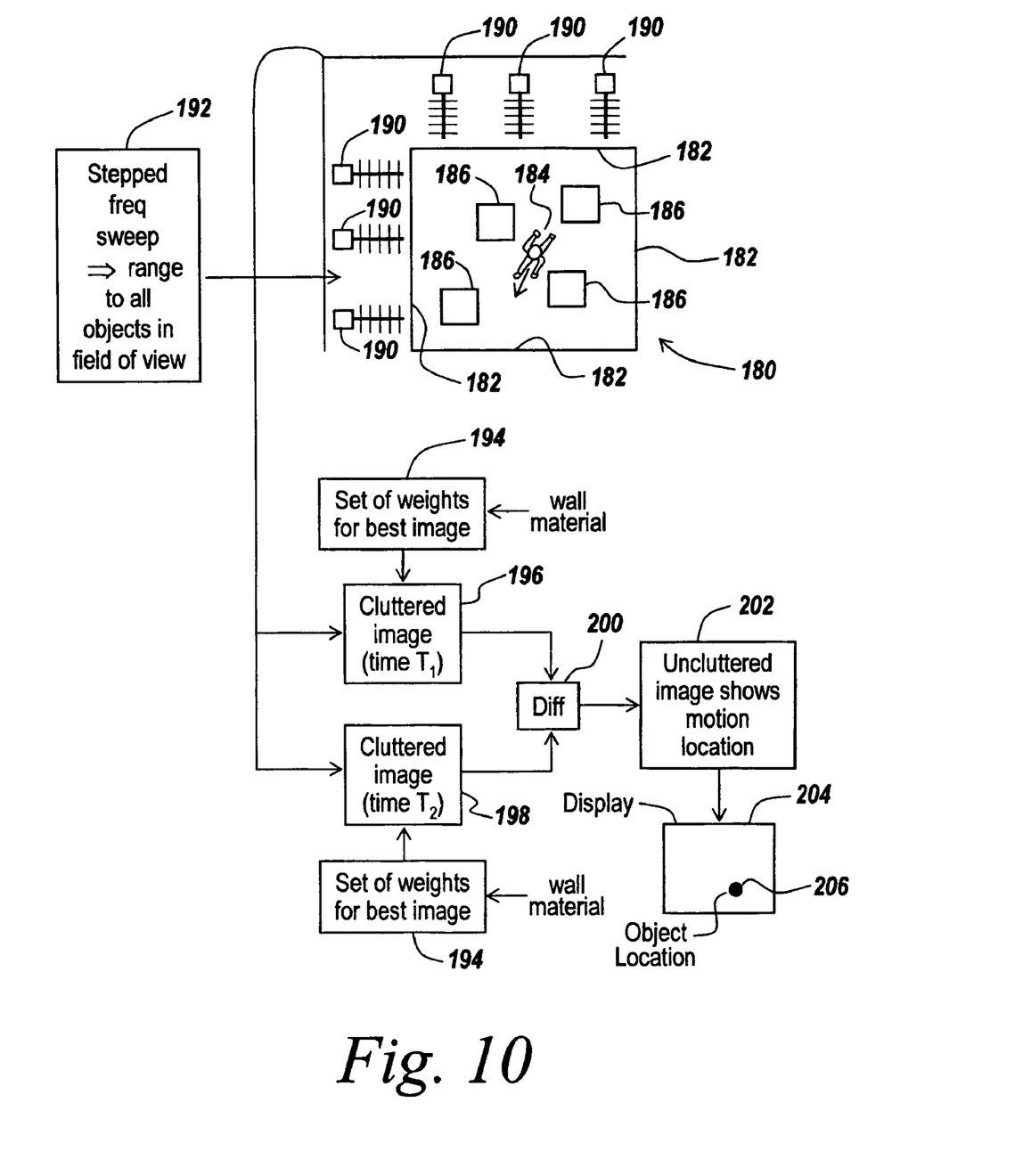
FIG. 10 is a diagrammatic illustration of the use of multiple frequency-stepped radars, the weighting of the results and the use of differential image processing for clutter rejection; and, FIG. 11 is a diagrammatic illustration of the frequency stepping of a multi-tone CW radar.

Referring now to FIG. 10, a building 180 has walls 182 that surround an area in which a moving individual 184 is located.

Individual 184 moves through the building amongst non-moving objects 186. It is the purpose of the subject invention to robustly detect the presence of a moving individual, to more accurately pinpoint his or her position and to reject clutter from radar returns that are reflected by non-moving objects.

In order to triangulate on the moving individual, a number of multi-tone CW radars 190 are positioned about building 180 such that radiation from the radars penetrates walls 182 so as to probe the interior of the building. Note that either multiple radars may be positioned about the building or a radar may be moved from one position to the next.

Regardless, in order to cancel out the variable effects of wall thickness and changes in index of refraction due to the passage of pulses through the wall, each of radars 190 have their two-tone frequencies stepped from a low frequency of 700 MHz to a high frequency of 2.3 GHz as illustrated at 192 for the purpose of sharpening the pulses that are smeared out or distorted as the pulses pass through the wall. As illustrated, the stepped frequency sweep provided by unit 192 results in improved range measurements to all objects in the field of view of the radars. Note that the use of multiple frequencies in and of itself improves range accuracy. The range and the triangulation measurements are made in accordance with the aforementioned apparatus.

The purpose of stepping the frequency of each of the radars is to be able to project through walls 182 a range of frequencies to be able to provide a set of weights, here illustrated at 194, that correct for the distortion of the pulses as they pass through the walls in both directions. This means for each frequency that post processing eliminates the distortion of a pulse as it is projected through a wall and then corrects out the wall effect for the returned pulses.

The reason that one can sharpen the pulses by removing distortion is because the wall affects the pulses differently at different frequencies. Thus lower frequencies are distorted differently from higher frequencies.

The distortion is a function of both the wall thickness and its index of refraction, which depends on the material of which the wall is constructed. Since all of these parameters affect the pulses differently at different frequencies, a set of weights is developed to weight the radar results to cancel out the distortion effects at each frequency.

One way to establish the weights is to take a known material and thickness and to measure the attenuation. Then knowing the attenuation, one generates weights that are proportional to the inverse of the attenuation.

If one starts off with the above, the weights can be refined by starting with a one-dimensional image through the wall, followed by the detection of a strong scatterer behind the wall. One then does a number of sub-frequency sweeps. Then for each frequency sweep one obtains an amplitude of the scatterer. The ratio of the amplitudes then yields the frequency-dependent attenuation. One can basically use the lowest frequency which has the lowest attenuation, whereupon one can derive the weighting at other frequencies. These are then the weights used.

With all of the frequencies compensated by the weighting scheme, the composite is equivalent to a sharpened pulse, which improves the range accuracies by as much as 50%.

One way of obtaining the parameters for the wall material is to either physically measure them or to estimate them.

Another way to obtain the wall material parameters is to perform an auto-focusing function which, when an object is in focus, specifies the wall thickness and index of refraction. How this is done is that one starts off with initial estimations of the index of refraction, absorption and wall thickness, i.e., the initial parameters. Then one forms an image, after which one adjusts the parameters and reforms the image. This is repeated using a method for sharpening gradient descent to maximize image sharpness. The parameters are for the sharpest image. These parameters are then used to generate the weights. This process can be repeated, i.e., forming an image and adjusting it in an iterative process to refine the weights.

Having sharpened the range results of the radars, the results are rendered into images as shown at 196 and 198. These images contain clutter in the sense that these images relate to both returns from moving objects and returns from non-moving objects. However, the images are the result of measurements taken at different times, here time $T_1$ and time $T_2$. By subtracting one image from the other as illustrated at 200, one can generate an uncluttered image 202 whose pixels are caused only by objects in motion. The result as illustrated by display 204 is that a pixel 206 is a result of only reflections from moving objects, with images that are the result of reflections from non-moving objects canceled. As will be appreciated, pixel 206 provides an uncluttered view of moving object location.

Figure 11:
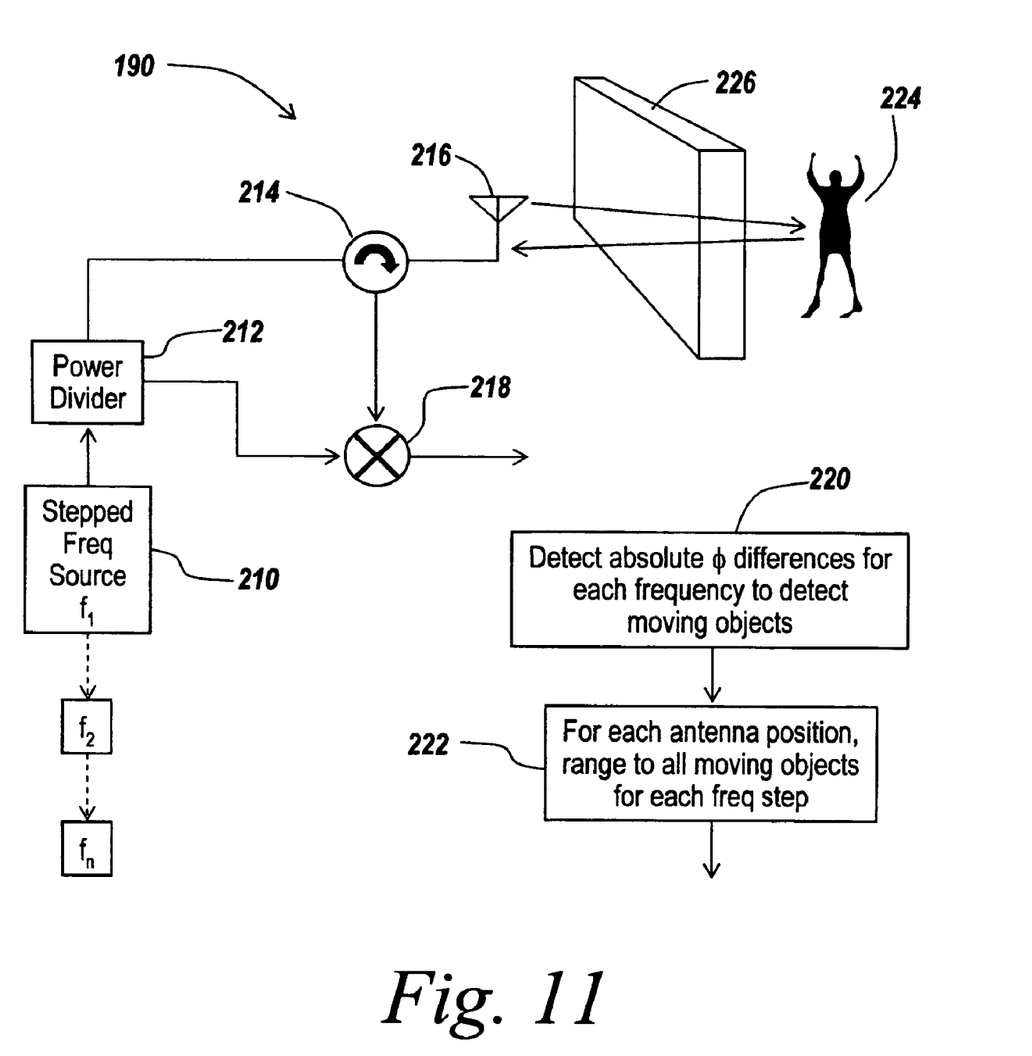

Referring to FIG. 11, what is shown is an expanded view of one of the radars 190 in FIG. 10, in which each radar includes a stepped frequency source 210 coupled to a power divider 212, which feeds a circulator 214 coupled to an antenna 216. A signal from power divider 212 and a signal from mixer 214 is applied to a multiplier 218 so as to detect the absolute phase differences for each frequency as illustrated at 220. Then for each antenna position one detects range to all moving objects for each frequency step as illustrated at 222.

It is this range for each frequency step for each antenna position that is weighted in accordance with the subject invention.

In summary, the use of multiple frequencies results in better range measurements. Secondly, better range measurements are obtained by using the subject weighting system. Thirdly, antennas at a large number of different locations result in better triangulation. Finally, the use of differential clutter rejection discriminates against returns from non-moving objects.

With multiple multi-tone radars, frequency stepping and differential image clutter rejection, one has provided an extremely robust system for detecting a moving individual 224 behind a wall 226.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for improving the resolution and clutter resistance of two-tone CW through-the-wall radars employing signals at two frequencies, the radars detecting and plotting the position of moving objects behind a wall, comprising the steps of:

driving the through-the-wall radars at a multiplicity of frequencies in a stepped fashion to obtain multiple radar readings at the multiple frequencies, said frequencies being separated by amounts to ensure detection of movement;

detecting the phase difference between transmitted energy and returns to obtain phase differences; and, utilizing wall-related weighting and averaging of the phase differences for improving range accuracy, the wall-related weighting weighting the results at each frequency to compensate for wall-induced distortions, the weighting being derived from the wall material characteristics and refractive index thereof, the wall material characteristics and the refractive index thereof being determined empirically.

2. The method of claim 1, and further including the steps of:

generating an image of the returns for each radar at a first time and at a second time; and, subtracting one image from the other such that what remains is a result of objects moving behind the wall, with images due to stationary objects having been canceled, thus to provide clutter rejection.

3. A method for improving the resolution and clutter resistance of two-tone CW through-the-wall radars employing signals at two frequencies, the radars detecting and plotting the position of moving objects behind a wall, comprising the steps of:

driving the through-the-wall radars at a multiplicity of frequencies in a stepped fashion to obtain multiple radar readings at the multiple frequencies, said frequencies being separated by amounts to ensure detection of movement;

detecting the phase difference between transmitted energy and returns to obtain phase differences; and, utilizing wall-related weighting and averaging of the chase differences for improving range accuracy, the wall-related weighting weighting the results at each frequency to compensate for wall-induced distortions, the weighting being derived from the wall material characteristics and refractive index thereof, the wall material characteristics and the refractive index thereof being estimated.

4. A method for improving the resolution and clutter resistance of two-tone CW through-the-wall radars employing signals at two frequencies, the radars detecting and plotting the position of moving objects behind a wall, comprising the steps of:

driving the through-the-wall radars at a multiplicity of frequencies in a stepped fashion to obtain multiple radar readings at the multiple frequencies, said frequencies being separated by amounts to ensure detection of movement;

detecting the phase difference between transmitted energy and returns to obtain phase differences; and, utilizing wall-related weighting and averaging of the phase differences for improving range accuracy, the wall-related weighting weighting the results at each frequency to compensate for wall-induced distortions, the weighting being derived from the wall material characteristics and refractive index thereof, the wall material characteristics and refractive index being derived from an auto-focus process, with the weights being determined when an object is in focus according to the auto-focus process.

5. The method of claim 4, wherein the achievement of the focus in the auto-focus process specifies the coefficient of refraction of the wall.

6. A method for improving the resolution and clutter rejection with respect to an image formed by the use of multiple multi-tone CW radars operating at multiple frequencies and positioned at different points about a building for the purpose of detecting the presence and location of a moving individual behind a building wall using through-the-wall multi-tone CW radars, comprising the steps of:

projecting multi-frequency energy from CW radars at different locations relative to the building;

generating for each radar an image using through-wall weighting and phase difference processing, the image depicting the position of a moving individual within the building at first and second times, the wall-related weighting weighting the results at each frequency to compensate for wall-induced distortions, the weighting being derived from the wall material characteristics and refractive index thereof, the wall material characteristics and the refractive index thereof being determined by one of empirical analysis, estimation and auto-focus; and, for each radar, subtracting one image from the other to remove the effect of returns from stationary objects within the building, thus to de-clutter a display of position of the moving individual.

7. The method of claim 6, and further including the step of frequency stepping each of the multi-tone radars.

8. The method of claim 7, and further including the step of averaging the results from projecting multiple frequencies through the wall.

9. The method of claim 7, and further including the step for each radar of applying a through-wall weight to returns at each of the frequencies, the weights being such as to compensate for wall-induced distortions.

10. A method for improving the resolution and clutter rejection with respect to an image formed by the use of multiple multi-tone CW radars operating at multiple frequencies separated by amounts to ensure detection of movement and positioned at different points about a building for the purpose of detecting the presence and location of a moving individual behind building walls using through-the-wall multi-frequency CW radars, comprising the steps of:

rendering from the outputs of all of said multi-tone radars a set of images derived at different times from returns from objects in the building in terms of the phase difference between transmitted energy and returns, weighting the phase difference results using through-wall weights and subtracting one image from another to eliminate representations on the generated image that are the result of returns from objects in the building that are not moving, such that what is depicted by the display is only due to a moving object, whereby the location of moving individuals within the building can be robustly determined, the wall-related weighting weighting the results at each frequency to compensate for wall-induced distortions, the weighting being derived from the wall material characteristics and refractive index thereof, the wall material characteristics and the refractive index thereof being determined by one of empirical analysis, estimation and auto-focus.

11. The method of claim 10, and further including the steps of frequency-stepping each of the multi-frequency radars and averaging the results such that the resolution of the range to a moving object is improved by averaging the results from projecting multiple frequencies through the wall and into the building.

12. The method of claim 11, and further including the step for each radar of applying a weight to returns at each of the frequencies, the weight being such as to compensate for wall-induced distortions, whereby resolution associated is increased due to the effective sharpening of returns from objects within the building due to compensation produced by the weighting.

13. A system for reliably determining the presence and location of a moving individual behind a wall, comprising:

a number of multi-tone CW through-the-wall radars employing signals at multiple frequencies separated by amounts to ensure detection of movement and located at different positions relative to the wall, said CW radars being driven at multiple frequencies and including processing for weighting the returns with through-wall weights, taking the phase difference between transmitted energy and returns at the different frequencies and averaging the results of the multiple frequencies returns to improve the range resolution of the radar; and, an auto-focusing system for determining when a moving object is in focus, said auto-focusing system providing an output used for determining said weights.

14. The system of claim 13, wherein the through-wall weighting includes weighting the returns at each of said frequencies to compensate for wall-induced distortions, whereby the sharpness of the radar returns is increased by removing distortions caused by said wall.

15. The system of claim 13, wherein said output of said auto-focusing system includes the index of refraction of said wall used to determine said weights.

16. The system of claim 13, and further including a visual image generator coupled to said radar for generating sequential images from returns from objects in said building, a differential image processor for subtracting one sequential image from the other and for outputting results only due to objects that have moved between the times associated with the different sequential images.

17. A method for improving the resolution and clutter resistance of two-tone CW through-the-wall radars that detect and plot the position of moving objects behind a wall, comprising the steps of:

driving the through-the-wall radars at a multiplicity of two-tone frequencies in a stepped fashion to obtain multiple radar readings at the multiple frequencies;

averaging the radar return results for improving range accuracy; and, weighting the results at each frequency to compensate for wall-induced distortions, the weighting being derived from the wall material characteristics and refractive index thereof, the wall material characteristics and the refractive index thereof being determined empirically.

18. A method for improving the resolution and clutter resistance of two-tone CW through-the-wall radars that detect and plot the position of moving objects behind a wall, comprising the steps of:

driving the through-the-wall radars at a multiplicity of two-tone frequencies in a stepped fashion to obtain multiple radar readings at the multiple frequencies;

averaging the radar return results for improving range accuracy; and, weighting the results at each frequency to compensate for wall-induced distortions, the weighting being derived from the wall material characteristics and refractive index thereof, the wall material characteristics and the refractive index thereof being estimated.

19. A method for improving the resolution and clutter resistance of two-tone CW through-the-wall radars that detect and plot the position of moving objects behind a wall, comprising the steps of:

driving the through-the-wall radars at a multiplicity of two-tone frequencies in a stepped fashion to obtain multiple radar readings at the multiple frequencies;

averaging the radar return results for improving range accuracy; and, weighting the results at each frequency to compensate for wall-induced distortions, the weighting being derived from the wall material characteristics and refractive index thereof, the wall material characteristics and refractive index being derived from an auto-focus process, with the weights being determined when an object is in focus according to the auto-focus process.

20. The method of claim 19, wherein the achievement of the focus in the auto-focus process specifies the coefficient of refraction of the wall.

21. A system for reliably determining the presence and location of a moving individual behind a wall, comprising:

a number of multi-tone CW through-the-wall radars located at different positions relative to the wall, said CW radars being driven at multiple frequencies and including processing for averaging the returns at the multiple frequencies to improve the range resolution of the radar; and, an auto-focusing system for determining when a moving object is in focus, said auto-focusing system providing an output used for determining said weights.

22. The system of claim 21, wherein said output of said auto-focusing system includes the index of refraction used to determine said weights.

* * * * *